United States Patent [19]

Ferrato

[11] Patent Number: 4,659,499
[45] Date of Patent: Apr. 21, 1987

[54] LIQUID CRYSTAL MATERIALS
[75] Inventor: Joseph P. Ferrato, Bath, Ohio
[73] Assignee: Crystaloid Electronics Company, Hudson, Ohio
[21] Appl. No.: 688,008
[22] Filed: Dec. 31, 1984
[51] Int. Cl.⁴ .................. C09K 19/60; C09K 19/30; C09K 19/46; C07C 121/75
[52] U.S. Cl. .................. 252/299.1; 252/299.61; 252/299.63; 252/299.64; 252/299.65; 252/299.66; 252/299.67; 558/414
[58] Field of Search ........... 252/299.63, 299.6, 299.01, 252/299.61, 299.64, 299.67, 299, 65, 299.1, 299.66; 260/465 G, 465 H, 465 K, 465 R; 558/414

[56] References Cited

U.S. PATENT DOCUMENTS

| | | | |
|---|---|---|---|
| 4,279,770 | 7/1981 | Inukai et al. | 252/299.63 |
| 4,330,426 | 5/1982 | Eidenschink et al. | 252/299.63 |
| 4,368,135 | 1/1983 | Osman et al. | 252/299.63 |
| 4,406,814 | 9/1983 | Ferrato | 252/299.62 |
| 4,439,015 | 3/1984 | Rich et al. | 252/299.63 |
| 4,479,885 | 10/1984 | Mukoh et al. | 252/299.63 |

FOREIGN PATENT DOCUMENTS

| | | | |
|---|---|---|---|
| 19665 | 12/1980 | European Pat. Off. | 252/299.63 |
| 99488 | 1/1984 | European Pat. Off. | 252/299.63 |
| 2939782 | 4/1981 | Fed. Rep. of Germany | 252/299.64 |
| 82/34176 | 2/1982 | Japan | 252/299.63 |
| 82/49688 | 3/1982 | Japan | 252/299.63 |
| 83/29876 | 2/1983 | Japan | 252/299.63 |
| 83/118886 | 7/1983 | Japan | 252/299.67 |
| 83/118884 | 7/1983 | Japan | 252/299.63 |
| 83/142965 | 8/1983 | Japan | 252/299.63 |
| 83/142966 | 8/1983 | Japan | 252/299.63 |
| 2078727 | 1/1982 | United Kingdom | 252/299.6 |

Primary Examiner—Teddy S. Gron
Assistant Examiner—Jack Thomas
Attorney, Agent, or Firm—Oldham, Oldham & Weber

[57] ABSTRACT

A liquid crystalline material for use in optic displays has the general formula:

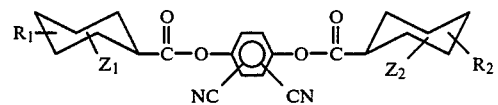

wherein $R_1$ and $R_2$ can be the same or different and are generally an alkyl group having from 1 to 12 carbon atoms, an alkoxy group having from 1 to 12 carbon atoms, or other groups as set forth herein. $Z_1$ and $Z_2$ can be the same or different and generally is an alkyl group having from 1 to 4 carbon atoms, a halogen, a cyano, or hydrogen. Such a material has a wide nematic range, good viscosity and good solubility such that it can be readily utilized in commercial applications. The nematic material can also be utilized with small amounts of dichroic dyes or mixed with other liquid crystalline materials.

19 Claims, No Drawings

LIQUID CRYSTAL MATERIALS

TECHNICAL FIELD

The present invention relates to new compounds, said compounds being useful as a negative dielectric nematic liquid crystal, which has good solubility and viscosity. More specifically, the present invention relates to such liquid crystal materials for use in various optic display devices.

BACKGROUND ART

U.S. Pat. No. 4,082,686 relates to a liquid crystal based upon a Schiff Base that is known to be unstable and generally exhibit a mesomorphic range higher than about 45° C. Similarly, U.S. Pat. No. 4,090,975 also utilizes a Schiff Base.

U.S. Pat. No. 4,202,791 relates to a nematic liquid crystal containing a cyclohexane ring therein, whereas U.S. Pat. No. 4,216,109 relates to a liquid crystal of a biphenyl type having a chlorine atom pendant to one of the phenyl groups.

U.S. Pat. No. 4,228,030 also relates to a liquid crystal material incorporating a cyclohexane ring therein, whereas U.S. Pat. No. 4,229,315 relates to liquid crystalline materials containing disubstituted cyclohexane groups.

However, none of these above patents teach a nematic liquid crystal having applicant's general formulation or good solubility.

German Offenlegungsschrift 2636684 generally relates to a cyclohexane-phenyl compound having alkyl groups or alkoxy groups substituted thereon. Japanese Pat. No. 57-49688 generally relates to a biphenyl group being substituted on each end thereof by a substituted cyclohexane.

U.S. Pat. No. 4,130,502 is a U.S. counterpart of the above German Publication 2636684.

U.S. Pat. No. 4,228,030 relates to various liquid crystal compositions generally containing substituted phenyl-cyclohexane compounds.

U.S. Pat. No. 4,330,426 also relates to liquid crystal compounds having a biphenyl-cyclohexane nucleus with the cyclohexane group and the phenyl group containing substituted alkyl groups thereon.

U.S. Pat. No. 4,331,552 relates to partially hydrogenated oligo-1,4-phenylenes which may be substituted.

U.S. Pat. No. 4,410,445 also relates to liquid crystal dielectrics containing phenyl or cyclohexyl rings in combination which may contain substituted groups thereon.

However, none of these patents relate to applicant's liquid crystal compound as disclosed herein.

DISCLOSURE OF INVENTION

It is thus an aspect of the present invention to provide new compounds that are useful as nematic liquid crystalline materials which contain two cyclohexyl carboxylate groups therein.

It is yet a further aspect of the present invention to provide a nematic liquid crystal material, as above, which has good solubility.

It is yet another aspect of the present invention to provide a nematic liquid crystal material, as above, which can be used with other nematic liquid crystal materials over a wide range.

It is a still further aspect of the present invention to provide a nematic liquid crystal material, as above, which can be utilized in association with small amounts of various dichroic dyes.

It is a still further aspect of the present invention to provide a nematic liquid crystal material, as above, wherein said nematic liquid crystal material in the present invention can be utilized in association with other nematic liquid crystals.

These aspects and other aspects of the invention are achieved by:

The new compounds having the formula:

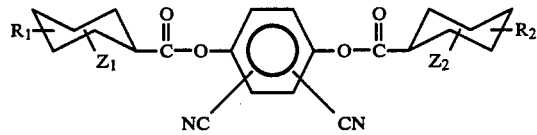

wherein $R_1$ and $R_2$ can be the same or different and are selected from the group consisting of an alkyl having 1 to about 22 and preferably from 1 to 12 carbon atoms, an alkoxy having from 1 to about 20 and preferably 1 to 12 carbon atoms, an alkyl substituted phenyl having from 7 to 26 and preferably 7 to 18 carbon atoms, an alkoxy substituted phenyl having from 7 to 18 carbon atoms, a fluoro substituted phenyl having from 1 to 3 fluoro groups, and a fluoro-alkyl substituted phenyl having from 1 to 3 fluoro groups and from 1 to 6 carbon atoms; wherein $Z_1$ and $Z_2$ can be the same or different, and wherein $Z_1$ and $Z_2$ is an alkyl group having from 1 to about 20 and preferably 1 to 4 carbon atoms, fluoro, chloro, bromo, cyano, or a hydrogen atom.

The disubstituted cyclohexyl carboxylates of the dihydroxyl dicyano benzene or the dicyano dihydroquinone of the above formula have the ability to store and release much energy but also exhibit the characteristic of being a nematic liquid crystalline material over wide ranges with relatively good viscosities, desirable melting points, and solubility in other liquid crystalline materials. As the carbon chain of the $R_1$ and $R_2$ substituents in the above formula exceeds about 12 atoms in the alkyl or alkoxy groups and about 18 in the alkyl substituted phenyl or alkoxy substituted phenyls, the solubility increases or varies in the best solution to such an extent these lower carbon chains become preferred for ease of design and operation. Likewise, when the number of carbons in the $Z_1$ and $Z_2$ substituents is 1 to 4, they are preferred. The chain lengths of these substituents also effect the melting point and viscosities.

BEST MODE FOR CARRYING OUT THE INVENTION

A nematic liquid crystal of a negative dielectric anisotropy material according to the present invention has the formula:

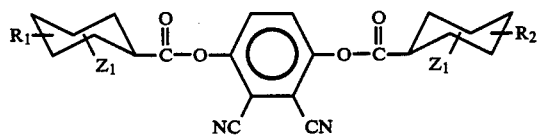

wherein $R_1$ and $R_2$ can be the same or different and can be located at any position although the four (4) position is preferred, as in these positions they are equatorial. $R_1$ and $R_2$ can be an alkyl group having preferably from 1 to 12 carbon atoms, desirably from 1 to 8 carbon atoms, with 4 to 6 carbon atoms being the more preferred. $R_1$ and $R_2$ can also be an alkoxy having preferably from 1 to 12 carbon atoms, desirably from 1 to 8 carbon atoms, with 3 carbon atoms being the more preferred. $R_1$ and $R_2$ can also be an alkyl substituted phenyl having preferably from 7 to 18 carbon atoms, with 7 to 13 carbon atoms being the more preferred. $R_1$ and $R_2$ can also be an alkoxy substituted phenyl having desirably from 7 to 18 carbon atoms with from 7 to 13 carbon atoms being preferred. Moreover, $R_1$ and $R_2$ can be a fluoro substituted phenyl having up to 3 fluorine atoms with 1 fluorine atom being preferred. $R_1$ and $R_2$ can further be a fluoro-alkyl substituted phenyl wherein the alkyl group has from 1 to 6 carbon atoms and the number of fluorine atoms is from 1 to 3, e.g. trifluoromethylphenyl. If $R_1$ and $R_2$ tend to be short-chained, the negative nematic liquid crystal will tend to have a high melting point and a low viscosity relative to $R_1$ and $R_2$ being longer chained which results in a lower melting point but a higher viscosity.

Considering the $Z_1$ and $Z_2$ groups, they can be the same or different and are generally an alkyl group having from 1 to 4 carbon atoms, with methyl being preferred. $Z_1$ and $Z_2$ can also be a fluoro group, a chloro group, a cyano group, or a hydrogen atom. Although $Z_1$ and $Z_2$ can occupy any position, the two or three position is desired, with the two position being preferred. Where the Z substituents are alkyl, it is desired that they be equatorial but when Z is cyano or fluoro, it may be the axial positions would be a more desirable position with certain devices.

A nematic liquid crystal of the present invention having the above formulation is generally referred to as a supernegative liquid crystal in that it has a negative dielectric anistropy extrapolated from measured $V_{10}$ values of from about minus 10 to about minus 30 and preferably from about minus 15 to about minus 25. Generally, it also has a very wide nematic range as from about 80° C. to about 130° C. at which temperature it generally turns isotropic, depending on the size, nature and position of the substitutents in the formula.

When utilized in combination with other liquid crystals, the overall composition generally has a low viscosity, that is, the viscosity of 100 centipoise, cps, or less, desirably 80 cps or less, and preferably 50 cps or less. Another advantage of the supernegative liquid crystal of the present invention is that it has good solubility, that is from about 3 percent to about 8 percent by weight in the host solution.

The new compounds of the present invention being a negative dielectric anisotropy or a liquid crystal is made by reacting the acid chloride of a compound having the following formula:

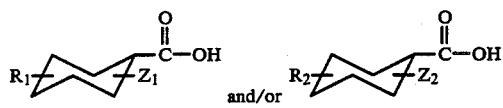

with a cyano benzene compound of the following formulation:

Intermediate #2 wherein $R_1$, $R_2$, $Z_1$, and $Z_2$ can have the values given for the equation on page 3 or as set forth above in a manner as described in Example 2. More specifically, two or more moles of the acid chloride of intermediate #1 A or B, or a mixture of both, is added dropwise at room temperature to a mixture of one mole of intermediate #2 in methylene chloride using triethylamine as a base activator. The reaction is generally carried out at room temperature and at atmospheric pressure although elevated temperature and pressure may be used.

The new compounds, i.e., the liquid crystal material of the present material can be utilized in various liquid crystal optical displays, both of the polarizer type as well as in association with a dichroic dye. Generally, the amount of dye is from about 0.1 to about 10 parts by weight and, preferably, from about 0.1 to about 4 parts by weight per 100 parts of any liquid crystal host can be utilized. The dichroic dye can neither be positive or negative, as desired, and any conventional or common type of dye can be utilized. For example, azo base type dyes, anthraquinones or naphthaquinone base type dyes, as well as tetrazine type dyes can be utilized. Examples of specific dichroic dyes are set forth in U.S. Pat. No. 4,406,814, which is hereby fully incorporated by reference.

The negative dielectric anisotropy liquid crystal of the present invention can also be utilized in association with one or many other liquid crystals, generally of the negative dielectric anisotropy or of a weak-positive dielectric anisotropy. Such other liquid crystals can be any conventional or known type crystals and are utilized to impart a favorable stability, response time, low viscosity, high clearing points, wide nematic temperatures, or other properties that contribute favorably to the overall liquid crystal host material. The amount of the negative dielectric anisotropy liquid crystalline material of the present invention by weight in 100 total parts by weight of a composition containing various or numerous liquid crystals is from about 0.5 to about 40 percent by weight, desirably from about 0.5 to about 20 percent by weight, preferably from about 1 to 10 percent by weight, and more preferably from about 3 to 8 percent by weight. Examples of various general types or classes of liquid crystals that are well known include the various phenylcyclohexanes, the various pyrimidines, various laterally substituted ethanes, the various phenyldioxanes, the various biphenyls, and the like.

If a liquid crystal mixture of low viscosity and high clearing points are desired, the liquid crystal of the present invention may be utilized in combination with various esters of alkylcyclohexane benzoates, with examples of such specific liquid crystals having the following formula:

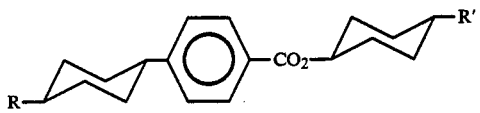

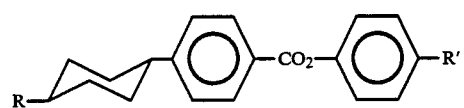

Generally, R and R' can be the same or different and is an alkyl having from 1 to 12 carbon atoms, an alkoxy having from 1 to 12 carbon atoms, a cyano or a hydrogen atom. Although the cyanophenyl-alkyl cyclohexane benzoates of the formulas above can be used in conjunction with the compounds of this invention, they are less desirable therewith where the combination is to be used as a negative anisotropic fluid.

Various alkyl and alkoxy phenyl cyclohexanes and dioxanes can also be utilized to impart viscosity-reducing properties with the compounds of this invention, as for example the following:

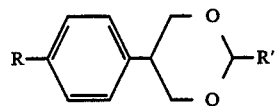

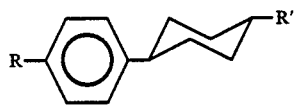

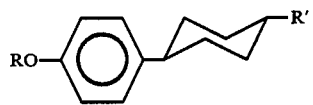

where R and R' are as set forth immediately above and has the same carbon atom range. Various halogenated phenyl and biphenyl cyclohexanes can be utilized to impart high temperature properties as well as low viscosity with the compounds of this invention, with specific examples being the following:

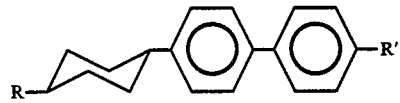

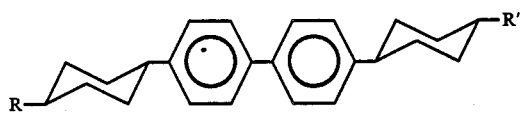

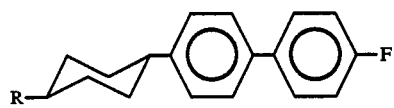

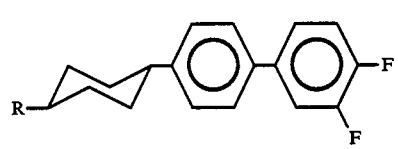

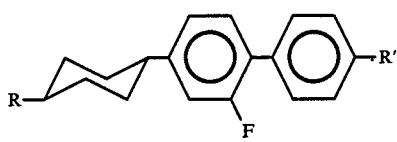

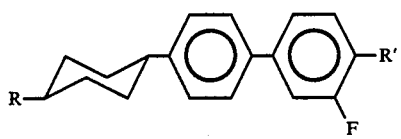

wherein R and R' are as set forth above.

Examples of nematic liquid crystals having small to medium negative dielectric anisotropy property include the following

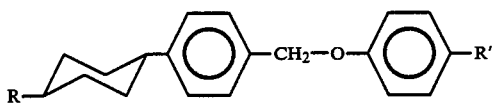

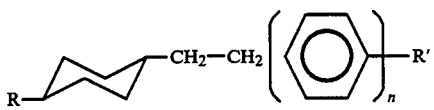

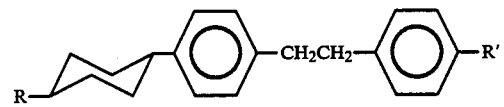

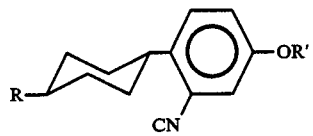

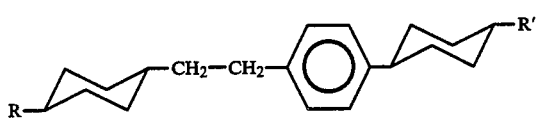

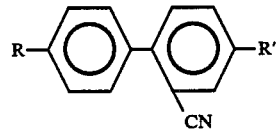

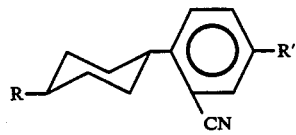

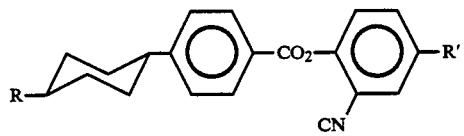

where R and R' are set forth above.

Examples of strong negative anisotropy materials include the following

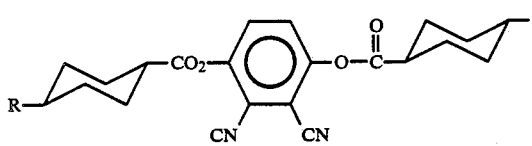

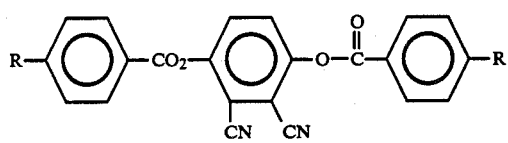

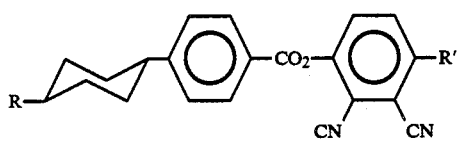

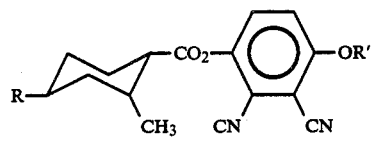

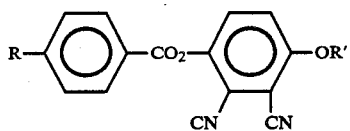

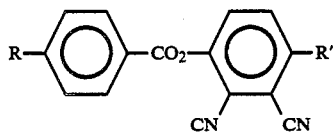

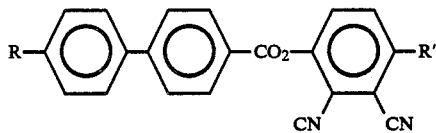

where R and R' are set forth above and have the same carbon atom range.

Naturally, many other types of nematic liquid crystal materials or fluids can also be utilized herewith. For example, the nematic liquid crystals of the present invention can also be used in combination with chiral cholesteric liquid crystal twisting agents, e.g. cholesterol oleate, or 4-cyano-4'-(2-methylbutoxy)biphenyl available commercially as CB 15.

The present invention will be better understood by preference to the following examples.

EXAMPLE 1

A compound having the following formulation was prepared as set forth below.

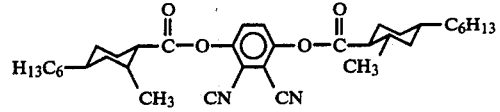

Gently heat 1.0 gm

with 579 mg thioyl chloride 5 to 10 min. at 50° to 60° C., cool and add to a mixture of 389 mg. 2,3-dicyanohydroquinone

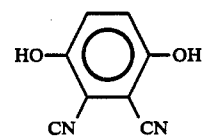

dissolved in 100 ml $CH_2Cl_2$ and 0.71 ml triethylamine. Stir three hours, wash three times with $H_2O$, wash four times with 5 percent KOH, four times with DI (deionized) water, dried over $Na_2SO_4$, filter, strip and recrystallize three times from isopropanol. This yields 400 mg. of the compound given under Example 1, that is crystalline to nematic at 90° C., sematic to nematic at 135° C., nematic to isotropic state at 140.3° to 140.6° C.

EXAMPLES 2 AND 3

In the exact same manner as set forth in Example 1, a nematic liquid crystal was made having butyl end groups thereon as well as a liquid crystal having pentyl end groups thereon in lieu of the hexyl end groups thereon as set forth in Example 1. The starting compound was the same as shown in the first portion of Example 1 except having their respective butyl or pentyl end groups thereon. The liquid crystal having the butyl end group thereon had a namatic-isotropic transition temperature of approximately 130° C. whereas the nematic liquid crystal having the pentyl end groups thereon had a nematic-isotropic transition temperature of approximately 127° C. and had the following structural formula when starting material was pentyl:

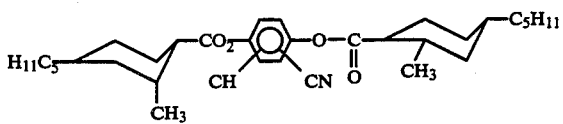

The amyl derivative prepared above was a preferred nematic liquid crystalline compound, as it gave excellent results in a liquid crystalline device.

EXAMPLE 4

Tests to show improved solubility over non-methylated homologue. Three percent solutions of

9

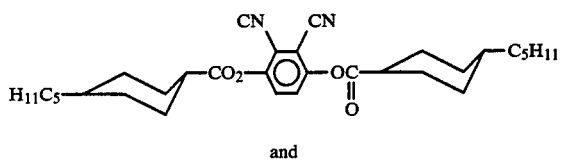

and

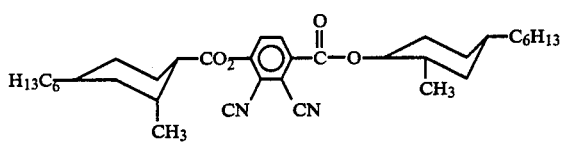

(a control of NP-1221 was also used). The first compound (without the methyl side chain) precipitated out flat crystals after three days, the compound I solution, i.e., the one with methyl side chain showed no precipitate after ≧4 months. Other solutions using the $C_4$ and $C_5$ homologue of the methyl homologue has a good or better solubility and resistance to precipitation.

EXAMPLE 5

An example of the liquid crystal of the present invention utilized with numerous other liquid crystals to form an overall negative dielectric anisotropy material is set forth in this Example.

The following compounds were mixed:

| Compound | % Weight |
| --- | --- |
| 1. MeO—⟨○⟩—CO₂—∼—$C_5H_{11}$ | 22.6 |
| 2. MeO—⟨○⟩—CO₂—∼—$C_3H_7$ | 11.2 |
| 3. $H_{11}C_5$—∼—CO₂—⟨○⟩—OEt | 13.5 |
| 4. $C_4H_9$—∼—CO₂—⟨○⟩—Me | 11.2 |
| 5. MeO—⟨○⟩—CO₂—⟨○⟩—$C_5H_{11}$ | 9.0 |
| 6. BuO—⟨○⟩—∼(CH₃)—CO₂—⟨○⟩—$C_3H_7$ | 11.2 |
| 7. BuO—⟨○⟩—∼(CH₃)—CO₂—∼—$C_3H_7$ | 11.2 |
| 8. Et—O—⟨○⟩—∼(CH₃)—CO₂—∼—$C_3H_7$ | 10.1 |
| Total of 1 to 8 ingredients | 100.0 | as made above were prepared using NP-1221 (Merch) as the host. Both samples were placed in a 0° C. chamber and observed over time for precipitation of crystals To 4.0 g of the above mix, 0.412 g each of compounds 9 and 10 were added and dissolved. Clearing point 68° to 69° C.

9. 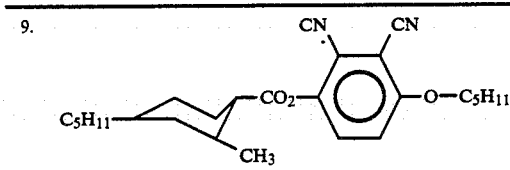

10. 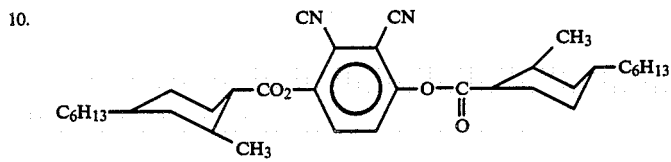

This negative mixture had a viscosity of 78 cps at 19° C. (measured on a Weissenberg Rheogoneometer Model #R17). This viscosity may be deemed high until it is considered that the mixture contains all esters and that more than 30 percent are 3 ring esters, utilized to optimize the "on state" or order parameter of the host for positive image guest host applications.

To 1.0 g of this negative host (negatively to be established below) was added:

In an 8 micron display with perpendicular alignment, the offstate (against a white lambertain surface) was $0.71 \times 10^3$ foot candles (0.0 volts applied) and $0.32 \times 10^3$ foot candles in the energized on state (10 volts), thus exhibiting a positive contrast of 2.2 to 1. The 10 percent energized state was 2.8 volts, and 90 percent saturation was 5.5 volts.

EXAMPLE 6

0.0028 g PB$_3$*
0.0003 g Sudan Black B 0.0004 g Bayer anthraquinone blue dye #4471-4

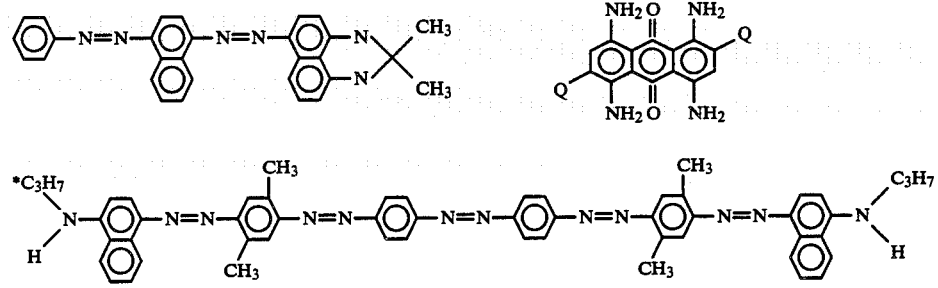

Another negative liquid crystal mixture was made containing the following compounds:

| | Compound | Weight Percent |
|---|---|---|
| 1. | Compound #1 - Ex 5 | 20 |
| 2. | Compound #2 - Ex 5 | 10 |
| 3. | Compound #3 - Ex 5 | 11 |
| 4. | Compound #5 - Ex 5 | 8 |
| 5. | H$_9$C$_4$—⟨⟩—CO$_2$—◯—OMe | 10 |
| 6. | H$_7$C$_3$—⟨⟩—◯—CO$_2$—⟨⟩—C$_3$H$_7$ | 10 |
| 7. | H$_7$C$_3$—⟨⟩—◯—CO$_2$—⟨⟩—C$_5$H$_{11}$ | 10 |

| Compound | Weight Percent |
|---|---|
| 8. 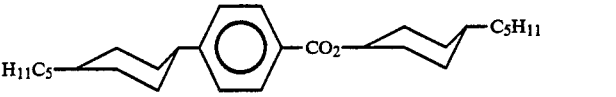 | 5 |
| 9.  | 4 |
| 10. 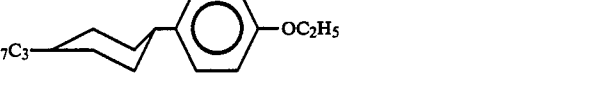 | 4 |
| 11. 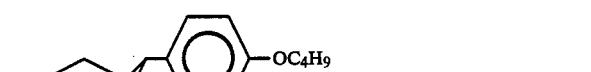 | 4 |
| 12.  | 4 |
| Total | 100 |

The viscosity of this mixture was 60 cps at 23° C. The nematic to isotropic transition temperature was 74° C. to 76° C.

EXAMPLE 7

Example where R is an alkoxy phenyl.
In a manner similar to Example 1, 0.5 grams of

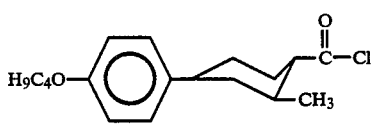

was added to a mixture of 0.13 grams of

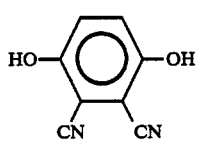

in 20 ml of $CH_2Cl_2$ and 0.2 ml. $Et_3N$. The mixture was stirred for approximately 3 hours and the product recovered as by washing and drying in a manner as set forth in Example 1. The final product isolated had the formula:

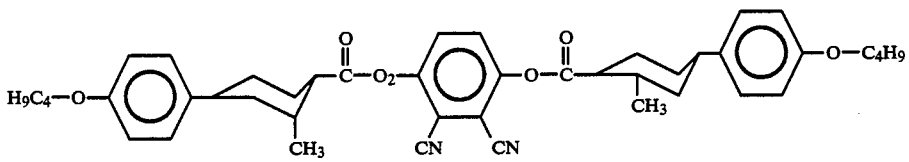

The melting point was approximately 100° C. and had a nematic phase to isotropic-transition temperature of 250° C. and greater.

Hence, the liquid crystal material of the present invention is suited for commercial applications and various liquid crystal optical displays. For example, they can be utilized in conventional nematic liquid crystal displays utilizing polarizers in conjunction therewith, or in other devices wherein nematic crystals are utilized.

While in accordance with the patent statues, a preferred embodiment and best mode has been presented, the scope of the invention is not limited thereto, but rather is measured by the scope of the attached claims.

What is claimed is:

1. A compound having the formula:

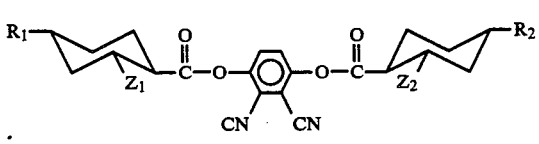

wherein $R_1$ and $R_2$ can be the same or different and are selected from the group consisting of an alkyl having from 1 to about 22 carbon atoms, an alkoxy having from 1 to about 20 carbon atoms, a 4-alkyl substituted phenyl having from 7 to 26 carbon atoms, a 4-alkoxy substituted phenyl having from 7 to 18 carbon atoms, a fluoro substituted phenyl having from 1 to 3 fluoro groups, and a fluoroalkyl substituted phenyl having from 1 to 3 fluoro groups and from 1 to 6 carbon atoms; wherein $Z_1$ and $Z_2$ can be the same or different, and wherein $Z_1$ and $Z_2$ are each an alkyl group having from 1 to 4 carbon atoms.

2. The compound according to claim 1, wherein said compound exhibits nematic liquid crystalline properties over the temperature range of from about 80° C. to about 130° C.

3. The compound according to claim 2, wherein said compound is a nematic liquid crystalline material with a negative dielectric anisotropy of from about minus 10 to about minus 30.

4. The compound according to claim 3, wherein said $R_1$ and $R_2$ are each an alkyl having from 1 to 12 carbon atoms or an alkoxy having from 1 to 18 carbon atoms.

5. The compound according to claim 4, wherein $R_1$ and $R_2$ are each selected from a hexyl group, a butyl group, or a pentyl group, located at the four position.

6. The compound according to claim 5, wherein $Z_1$ and $Z_2$ are each a methyl group located at the two position.

7. The compound according to claim 6, wherein said compound is a nematic liquid crystalline material and exhibits a negative anisotropy of from about minus 15 to about minus 25.

8. A liquid crystalline composition comprising at least two components, at least one being a compound according to claim 3, including from about 0.1 to about 10 parts by weight per 100 parts of said composition a dichroic dye to form a dichroic type nematic liquid crystalline composition.

9. A liquid crystalline composition comprising at least two components, at least one being a compound according to claim 4, including from about 0.1 to about 10 parts by weight per 100 parts of said composition a dichroic dye to form a dichroic type nematic liquid crystalline composition.

10. A liquid crystalline composition comprising at least two components, at least one being a compound according to claim 6, including from about 0.1 to about 10 parts of a dichroic dye by weight per 100 parts of said composition to form a dichroic liquid crystalline composition.

11. A nematic liquid crystalline composition comprising the compound according to claim 3, and at least one additional nematic liquid crystal compound, that amount of said compound ranging from about 1 percent to about 40 percent by weight based upon the total weight of said composition.

12. The nematic liquid crystal composition according to claim 11, wherein at least one additional nematic liquid crystal compound is selected from the group consisting of various phenylcyclohexanes, various pyridazines, various lateral substituted ethanes, various phenyldioxanes, various biphenyls, and combinations thereof.

13. The nematic liquid crystal composition according to claim 11, wherein the amount of said compound is from about 1 to about 20 percent by weight, and wherein said at least one additional liquid crystal compound is selected from the group consisting of

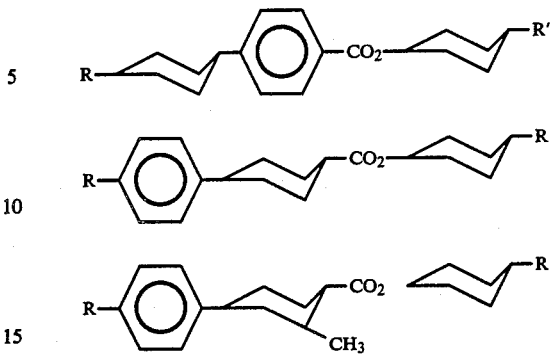

where R and R' can be the same or different and are each an alkyl having from 1 to 12 carbon atoms, an alkoxy having from 1 to 12 carbon atoms, a cyano, or a hydrogen atom.

14. The nematic liquid crystal composition according to claim 11, wherein the amount of said compound is from about 1 to about 20 percent by weight, and wherein said at least one additional liquid crystal compound is selected from the group consisting of

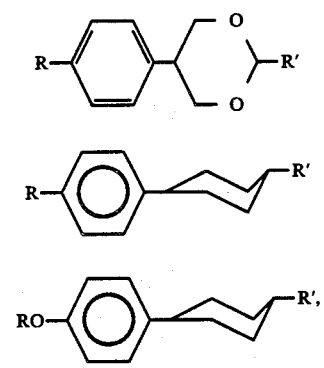

where R and R' can be the same or different and are each an alkyl having from 1 to 12 carbon atoms, an alkoxy having from 1 to 12 carbon atoms, a cyano, or a hydrogen atom.

15. The nematic liquid crystal composition according to claim 11, wherein the amount of said compound is from about 1 to about 20 percent by weight, and wherein said at least one additional liquid crystal compound is selected from the group consisting of

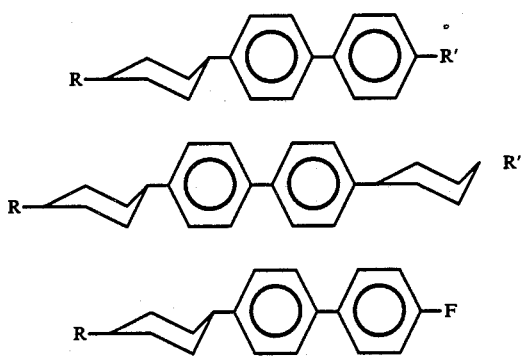

-continued

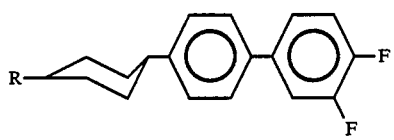

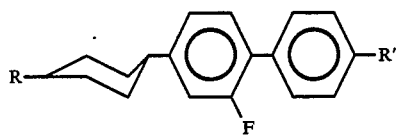

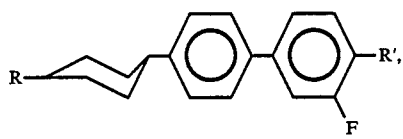

where R and R' can be the same or different and are each an alkyl having from 1 to 12 carbon atoms, an alkoxy having from 1 to 12 carbon atoms, a cyano, or a hydrogen atom.

16. The nematic liquid crystalline composition according to claim 11, wherein the amount of said compound is from about 1 to about 20 percent by weight, and wherein said at least one additional liquid crystal compound is selected from the group consisting of

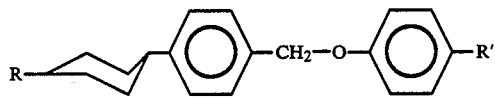

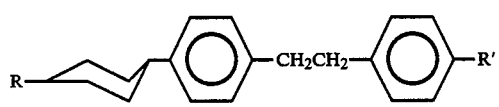

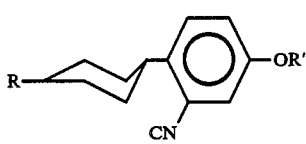

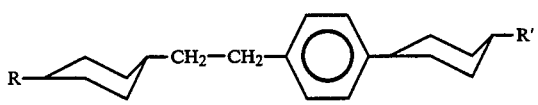

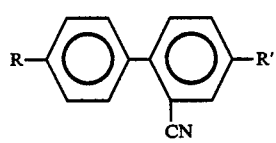

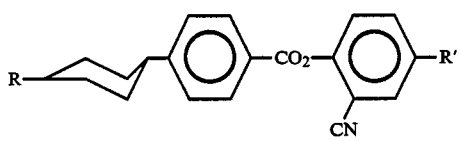

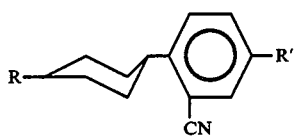

where R and R' can be the same or different and are each an alkyl having from 1 to 12 carbon atoms, an alkoxy having from 1 to 12 carbon atoms, a cyano, or a hydrogen atom.

17. The nematic liquid crystalline composition according to claim 11, wherein the amount of said compound is from about 1 to about 20 percent by weight, and wherein said at least one additional liquid crystal compound is selected from the group consisting of

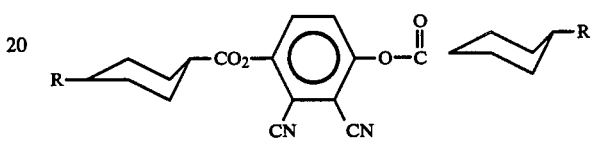

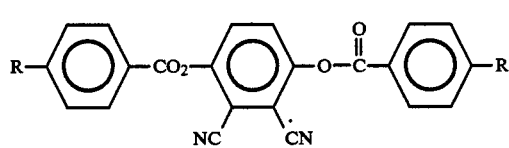

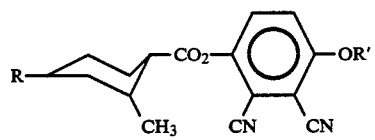

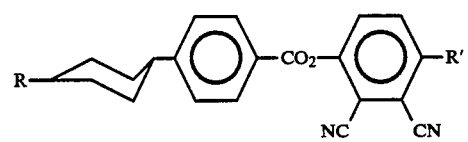

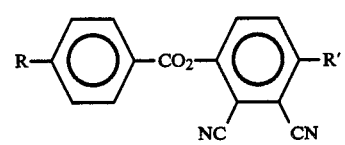

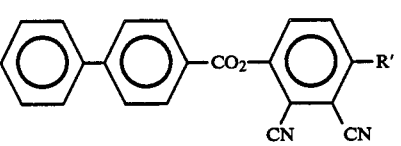

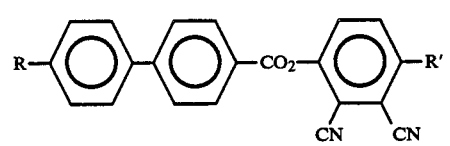

where R and R' can be the same or different and are each an alkyl having from 1 to 12 carbon atoms, an alkoxy having from 1 to 12 carbon atoms, a cyano, or a hydrogen atom.

18. The nematic liquid crystal composition according to claim 11, wherein the amount of said compound ranges from about 1 percent to about 20 percent by weight and includes from about 0.1 to about 10.0 parts by weight based upon 100 parts by weight of said compound of a dichroic dye.

19. A liquid crystalline optical display device having the compound of claim 3 as an element.

* * * * *